US008561079B2

(12) United States Patent
Suzuki et al.

(10) Patent No.: US 8,561,079 B2
(45) Date of Patent: Oct. 15, 2013

(54) INTER-THREAD LOAD ARBITRATION CONTROL DETECTING INFORMATION REGISTERED IN COMMIT STACK ENTRY UNITS AND CONTROLLING INSTRUCTION INPUT CONTROL UNIT

(75) Inventors: Takashi Suzuki, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 535 days.

(21) Appl. No.: 12/635,801

(22) Filed: Dec. 11, 2009

(65) Prior Publication Data

US 2010/0095304 A1 Apr. 15, 2010

Related U.S. Application Data

(63) Continuation of application No. PCT/JP2007/000665, filed on Jun. 20, 2007.

(51) Int. Cl.
G06F 9/46 (2006.01)
G06F 15/00 (2006.01)

(52) U.S. Cl.
USPC ........... 718/105; 718/102; 718/108; 712/208; 712/214; 712/228

(58) Field of Classification Search
None
See application file for complete search history.

(56) References Cited

U.S. PATENT DOCUMENTS

| | | | |
|---|---|---|---|
| 6,185,672 B1 * | 2/2001 | Trull | 712/217 |
| 6,212,544 B1 | 4/2001 | Borkenhagen et al. | |
| 6,357,016 B1 * | 3/2002 | Rodgers et al. | 713/601 |
| 6,961,935 B2 * | 11/2005 | Torii | 718/100 |
| 7,000,233 B2 * | 2/2006 | Levitan et al. | 718/107 |
| 7,707,390 B2 * | 4/2010 | Ozer et al. | 712/214 |
| 8,219,996 B1 * | 7/2012 | Morris | 718/104 |
| 2001/0004756 A1 | 6/2001 | Inoue | |
| 2003/0018686 A1 * | 1/2003 | Kalafatis et al. | 709/102 |
| 2004/0215945 A1 | 10/2004 | Burky et al. | |
| 2004/0216103 A1 * | 10/2004 | Burky et al. | 718/100 |
| 2004/0216105 A1 * | 10/2004 | Burky et al. | 718/100 |

(Continued)

FOREIGN PATENT DOCUMENTS

| | | |
|---|---|---|
| JP | 2000-20306 | 1/2000 |
| JP | 3714598 | 11/2005 |
| JP | 2006-343872 | 12/2006 |

OTHER PUBLICATIONS

International Search Report for PCT/JP2007/000665, mailed Sep. 18, 2007.

Nobuyuki Yamasaki Ed-Anonymous, "Responsive Multithread Processor for Distributed Real-Time Processing", Innovative Architecture for Future Generation High Performance Process ORS and Systems, 2006, IWIA '06. International Workshop On, IEEE, PI, Jan. 1, 2006, pp. 44-56.

(Continued)

*Primary Examiner* — Meng-Ai Lee
*Assistant Examiner* — Tammy Lee
(74) *Attorney, Agent, or Firm* — Staas & Halsey LLP

(57) ABSTRACT

The information processing device in the simultaneous multithreading system is operated in an inter-thread performance load arbitration control method, and includes: an instruction input control unit for sharing among threads control of inputting an instruction in an arithmetic unit for acquiring the instruction from memory and performing an operation on the basis of the instruction; a commit stack entry provided for each thread for holding information obtained by decoding the instruction; an instruction completion order control unit for updating the memory and a general purpose register depending on an arithmetic result obtained by the arithmetic unit in an order of the instructions input from the instruction input control unit; and a performance load balance analysis unit for detecting the information registered in the commit stack entry and controlling the instruction input control unit.

12 Claims, 7 Drawing Sheets

(56) References Cited

U.S. PATENT DOCUMENTS

| | | | |
|---|---|---|---|
| 2005/0240752 A1* | 10/2005 | Yokoi et al. | 712/1 |
| 2005/0240930 A1* | 10/2005 | Amamiya et al. | 718/100 |
| 2006/0020776 A1* | 1/2006 | Yoshida | 712/235 |
| 2006/0212853 A1* | 9/2006 | Sutardja | 717/131 |
| 2006/0230408 A1* | 10/2006 | Frigo et al. | 718/108 |
| 2008/0250233 A1* | 10/2008 | Marden et al. | 712/228 |
| 2010/0005277 A1* | 1/2010 | Gibert et al. | 712/220 |

OTHER PUBLICATIONS

European Search Report dated Aug. 13, 2010 in corresponding European Patent Application 07790191.6.

Japanese Office Action mailed Apr. 24, 2012 issued in corresponding Japanese Patent Application No. 2009-520148.

* cited by examiner

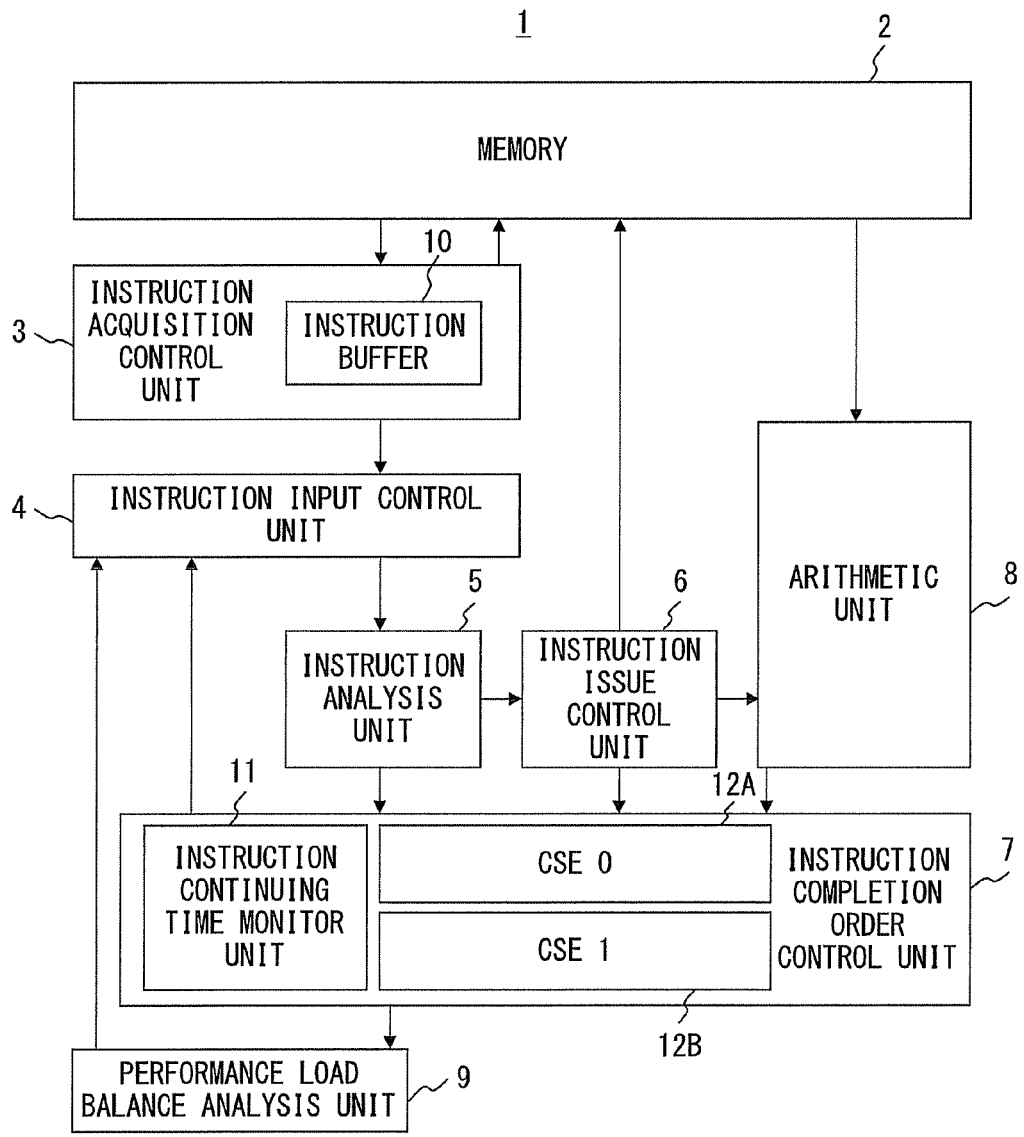
F I G. 1

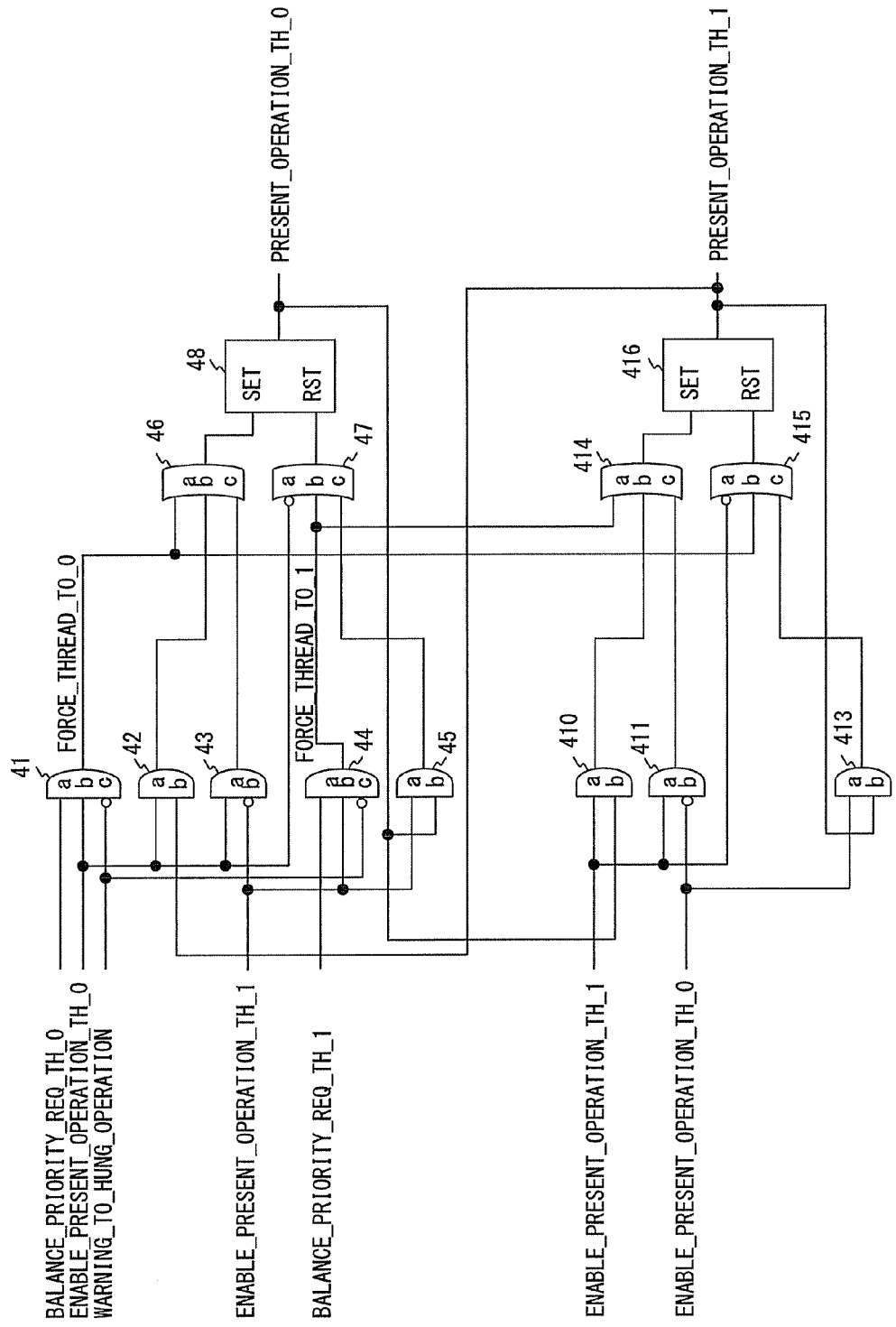
F I G. 4

INTER-THREAD LOAD ARBITRATION CONTROL DETECTING INFORMATION REGISTERED IN COMMIT STACK ENTRY UNITS AND CONTROLLING INSTRUCTION INPUT CONTROL UNIT

CROSS-REFERENCE TO RELATED APPLICATIONS

This application is a continuation application of International PCT Application No. PCT/JP2007/000665 which was filed on Jun. 20, 2007.

FIELD

The present invention relates to an information processing device, and more specifically to an information processing device in a simultaneous multi-threading system, and also to a load arbitration control method for arbitrating a performance load balance among a plurality of threads.

BACKGROUND

Recently, in the field of information processing devices, a super-scalar system for improving the use efficiency of each execution unit by parallelizing the processes of arithmetic operations, an out-of-order instruction executing system for improving the use efficiency of the execution unit by sequentially executing a plurality of independent instructions regardless of the occurrence order in a program, etc., are generally well known as means for improving overall performance.

However, in an information processing devices using the above-mentioned systems, all the internal execution units (arithmetic unit etc.) are operating, and the parallelism is not best utilized.

Therefore, a system of best utilizing the parallelism specific to an information processing device by processing instruction sequences not related to one another among a plurality of threads after distributing internal resources that are not being completely used in a single thread to the plurality of threads has been proposed as simultaneous multi-threading (SMT).

In SMT, even if a resource is shared by instruction sequences of a plurality of threads to improve the use efficiency, the resource cannot be used by other threads while the shared resource is used by one thread. Therefore, once a thread occupies the shared resource for a long time, another thread cannot continue processing, which is a problem.

SUMMARY

The present invention has been developed to solve the above-mentioned problem, and provides an information processing device in a simultaneous multi-threading system for arbitrating the performance load balance among threads by qualitatively determining the load balance among the threads, and also provides an inter-thread performance load arbitration control method.

The information processing device in the simultaneous multi-threading system according to an aspect of the present invention includes: an instruction input control unit for sharing among threads control of inputting an instruction to an arithmetic unit for acquiring the instruction from memory and performing an operation on the basis of the instruction; a commit stack entry provided for each thread for holding information obtained by decoding the instruction; an instruction completion order control unit for updating, in an order of the instructions input from the instruction input control unit, the memory and a general purpose register depending on an arithmetic result obtained by the arithmetic unit; and a performance load balance analysis unit for detecting the information registered in the commit stack entry and controlling the instruction input control unit on the basis of the result of the detection.

It is preferable that the instruction completion order control unit define the time in which the information is not registered in the commit stack entry as the time in which the thread does not perform instruction processing, and generate an empty flag indicating only the commit stack entry in which the information is not registered is empty.

It is preferable that the performance load balance analysis unit predetermine an instruction input priority request threshold for each commit stack entry, count the time in which the empty flag generated for each commit stack entry is issued, compare a priority thread value resulting from the counting on the commit stack entry with the instruction input priority request threshold, and generate an instruction input priority request flag for switching to the thread corresponding to the commit stack entry in which the empty flag is issued when the priority thread value exceeds the instruction input priority request threshold.

It is preferable that the performance load balance analysis unit predetermine a release threshold for release of the instruction input priority request flag for each commit stack entry, calculate a difference value indicating a difference between the priority thread value and a second priority thread value as a calculation of the time in which the empty flag generated for each commit stack entry in which another instruction input priority request flag is generated is issued, compare the difference value with the release threshold, and release an instruction input priority request flag for switching to the thread corresponding to the commit stack entry in which the empty flag is issued when the difference value exceeds the release threshold.

It is preferable that the instruction completion order control unit include an instruction continuing time monitor unit for outputting to the instruction input control unit a hang-up warning to avoid causing a hang-up by forcibly fixing the thread so as to release the instruction input priority of the thread which has input the instruction when the instruction processing of a suppressed thread is suspended for a predetermined time.

It is preferable that the instruction input control unit switch the thread in each cycle when all threads can input the instruction in a timely manner, and select a thread that can input the instruction when only one thread can input the instruction in a timely manner.

The present invention is an inter-thread performance load arbitration control method in a simultaneous multi-threading system, and includes: an instruction input control step of controlling an input timing of an instruction so as to acquire the instruction from memory and perform an operation on the basis of the instruction for each thread; and a performance load balance analyzing step of detecting information registered in the commit stack entry provided for each thread for holding the information obtained by decoding the instruction, and controlling the input of the instruction on the basis of the result of the detection.

It is preferable that the performance load balance analyzing step define the time in which the information is not registered in the commit stack entry as the time in which the thread does not perform instruction processing, and generate an empty flag indicating that only the commit stack entry in which the information is not registered is empty.

It is preferable that the performance load balance analyzing step predetermine an instruction input priority request threshold for each commit stack entry, count the time in which the empty flag generated for each commit stack entry is issued, compare a priority thread value resulting from the counting on the commit stack entry with the instruction input priority request threshold, and generate an instruction input priority request flag for switching to the thread corresponding to the commit stack entry in which the empty flag is issued when the priority thread value exceeds the instruction input priority request threshold.

It is preferable that the performance load balance analyzing step predetermine a release threshold for release of the instruction input priority request flag for each commit stack entry, calculate a difference value indicating a difference between the priority thread value and a second priority thread value as a calculation of the time in which the empty flag generated for each commit stack entry in which another instruction input priority request flag is generated is issued, compare the difference value with the release threshold, and release an instruction input priority request flag for switching to the thread corresponding to the commit stack entry in which the empty flag is issued when the difference value exceeds the release threshold.

It is preferable that the instruction input priority of the thread which has input the instruction is released when the instruction processing of a suppressed thread is suspended for a predetermined time.

It is preferable that the instruction input control step switch the thread in each cycle when all threads can input the instruction in a timely manner, and select a thread that can input the instruction when only one thread can input the instruction in a timely manner.

According to the present invention, the load balance among threads can be qualitatively determined, and the performance load balance among the threads can be arbitrated.

BRIEF DESCRIPTION OF DRAWINGS

FIG. 1 is a block diagram of a configuration of an information processing device of the present invention;

FIG. 4 is a block diagram of a configuration of an instruction input control unit;

Figure 2:
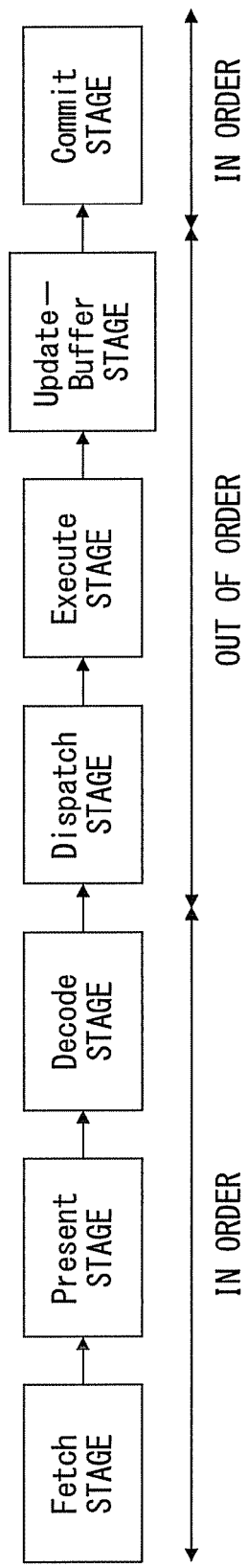
FIG. 2 is a block diagram of an instruction pipeline.

DESCRIPTION OF EMBODIMENTS (Explanation of the Principle)

The information processing device according to an embodiment of the present invention is operated in a superscalar system and an out-of-order instruction executing system, and realizes a simultaneous multi-threading system. The information processing device has a constitution wherein an instruction input control unit for controlling the input of an instruction from memory to an arithmetic unit is shared among threads, and an instruction completion order management unit for managing an instruction completion order can be multiplexed for each thread. The information processing device also has a performance load balance analysis unit for detecting, on the basis of the use situation of an instruction completion order unit, that there is occurring an unbalanced number of instruction execution cycles of each thread.

According to the information processing device configured above, when a bias in a performance load balance is detected, a thread for inputting an instruction is fixed. In addition, the performance load balance of each thread is arbitrated. Further, fixing a thread for inputting an instruction is suppressed so as not to over-suppress the process of a thread having a low priority.

The embodiments of the present invention are described below in detail with reference to the attached drawings.

(Embodiment 1)

(Configuration)

FIG. 1 illustrates a configuration of an information processing device 1 in the simultaneous multi-threading system. In the present embodiment, the information processing device 1 is configured by memory 2, an instruction acquisition control unit 3, an instruction input control unit 4, an instruction analysis unit 5, an instruction issue control unit 6, an instruction completion order control unit 7, an arithmetic unit 8, and a performance load balance analysis unit 9.

The memory 2 functions as cache or the like in the information processing device 1. The instruction acquisition control unit 3 is provided with an instruction buffer 10, performs control to acquire an instruction to perform an operation from the memory 2, and holds the acquired instruction in the instruction buffer 10.

The instruction input control unit 4 reads the instruction held in the instruction buffer 10, and transfers it to the instruction analysis unit 5. In addition, the instruction input control unit 4 limits the processing in the same cycle to one thread with respect to the instruction held in the instruction buffer 10, and inputs the instruction of one thread to the instruction analysis unit 5 while switching threads in each cycle as necessary.

The instruction analysis unit 5 decodes the instruction transferred from the instruction input control unit 4. The instruction issue control unit 6 controls an issuing of an instruction for performing the process corresponding to each code decoded by the instruction analysis unit 5. The arithmetic unit 8 performs an operation or the like on the basis of an operand provided from the instruction issue control unit 6.

The instruction completion order control unit 7 provides each thread with a commit stack entry 12A (CSE 0) and a commit stack entry 12B (CSE 1) for holding the information about the instruction decoded by the instruction analysis unit 5, determines whether or not the instruction can be completed according to the information registered in the commit stack entries 12A and 12B, and resets the information about the instruction upon completion of the instruction. That is, information is registered in the commit stack entries 12A and 12B between a dispatch stage and a commit stage, and during this time, any kind of instruction processing can be executed.

The instruction completion order control unit 7 is also provided with an instruction continuing time monitor unit 11. The instruction continuing time monitor unit 11 is a circuit for monitoring the hang-up.

A commit stack entry (CSE: Commit Stack Entry) is a buffer, and is assigned one entry for each instruction, and is used in monitoring the progress of the instruction being executed. In addition, the entries of the commit stack entry are nullified when an instruction executed in order according to the order of the instructions of the program is committed.

In addition, in FIG. 1, there are only two commit stack entries for the 2SMT, but two or more commit stack entries can be provided. The instruction completion order control unit 7 is connected to the instruction analysis unit 5 and determines whether or not the instruction can be completed according to the information registered in the commit stack entries 12A and 12B. Upon completion of the instruction, the information about the instruction is reset.

The performance load balance analysis unit 9 is connected to the instruction completion order control unit 7, detects the contents of the commit stack entries 12A and 12B, and controls the instruction input control unit 4 on the basis of the result of the detection.

In addition, it is assumed that the information processing device according to the present invention is operated in the SMT system, and each thread is operated in the super-scalar and out-of-order systems.

(Instruction Pipeline of Thread)

As illustrated in FIG. 2, it is assume that the information processing device 1 has a fetch stage, a present stage, a decode stage, a dispatch stage, an execute stage, an update-buffer stage, and a commit stage in an instruction pipeline.

In the fetch stage, an instruction is read from the memory 2 to the instruction buffer 10 to allow the arithmetic unit 8 for executing the instruction to execute the instruction on the basis of the control of the instruction acquisition control unit 3.

In the present stage, an instruction is input from the instruction buffer 10 to the instruction analysis unit 5 on the basis of the control of the instruction input control unit 4.

In the decode stage, an instruction is decoded by the instruction analysis unit 5.

In the dispatch stage, an instruction is issued to the instruction execution resources such as the arithmetic unit 8 etc. under the control of the instruction issue control unit 6.

In the execute stage, an instruction is executed by the instruction execution resources such as the arithmetic unit 8.

In the update-buffer stage, an execution result is awaited.

In the commit stage, the memory 2 and a general purpose register (although not illustrated in the attached drawings, connected to the arithmetic unit 8 via the data transfer bus and the control bus) are updated under the control of the instruction completion order control unit 7 in the instruction order on the basis of the execution result.

In these stages, the fetch stage, the present stage, the decode stage, and the commit stage are operated in order in the instruction order. The dispatch stage, the execute stage, and the update-buffer stage are operated not in the instruction order but in an out-of-order system in which instructions are executed when they are ready for execution regardless of the instruction order.

(Performance Load Balance Analysis Unit)

Figure 3:
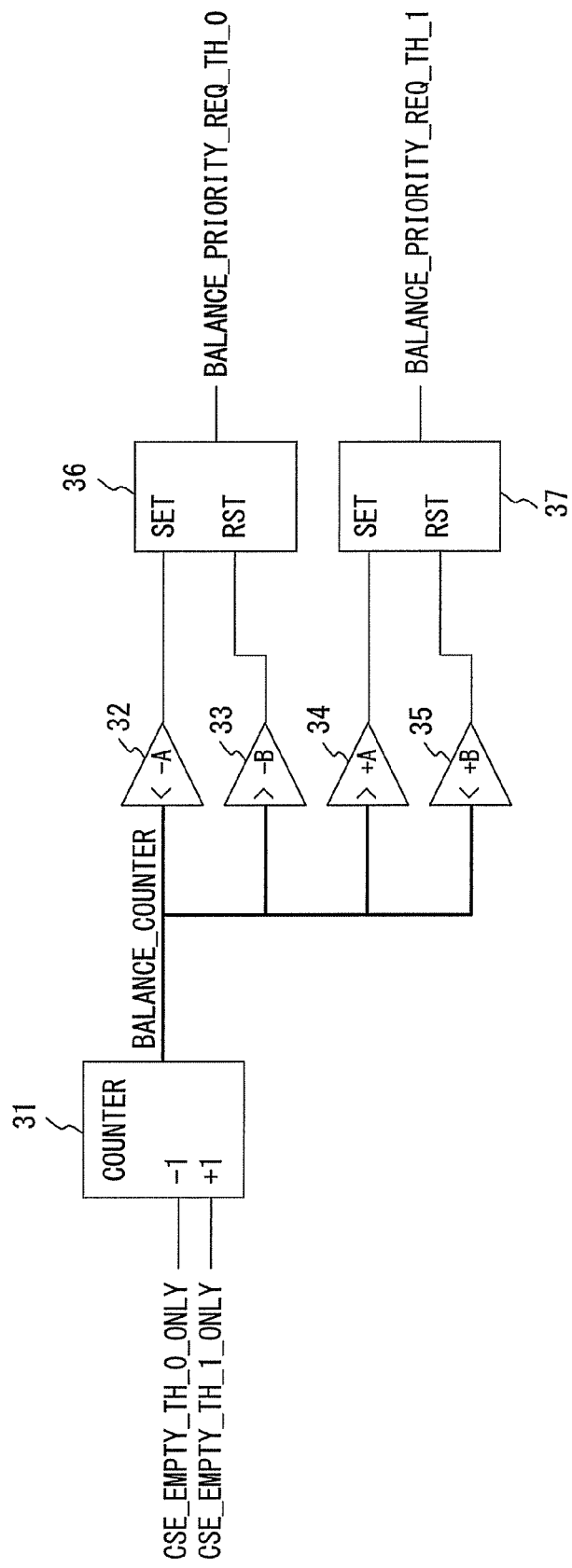
FIG. 3 is a block diagram of a configuration of a performance load balance analysis unit.

FIG. 3 illustrates a circuit of the performance load balance analysis unit 9. The performance load balance analysis unit 9 is connected to the instruction input control unit 4 and the instruction completion order control unit 7.

The performance load balance analysis unit 9 predetermines an instruction input priority request threshold for each commit stack entry. Then, the performance load balance analysis unit 9 counts the time in which an empty flag generated for each commit stack entry is issued, and compares the priority thread value resulting from the counting corresponding to the commit stack entry with the instruction input priority request threshold. When the priority thread value exceeds the instruction input priority request threshold, it is determined that the instruction processing balance is biased to the thread opposite the thread in which the empty flag is issued, and an instruction input priority request flag of the thread in which the empty flag is issued is generated to arbitrate the instruction processing balance.

In addition, the performance load balance analysis unit 9 predetermines a release threshold for release of an instruction input priority request flag for each commit stack entry. The performance load balance analysis unit 9 calculates a difference value between the priority thread value and a second priority thread value as a calculation of the time in which the empty flag generated for each commit stack entry in which another instruction input priority request flag is generated is issued. Then, the difference value is compared with the release threshold, and when the difference value exceeds the release threshold, it is determined that the bias of the instruction processing balance has been corrected, and the instruction input priority request flag of the thread in which the empty flag is issued is released.

In the present embodiment, an SMT having two thread is described for simplicity.

Assuming that a cycle in which no information is registered in a commit stack entry of a thread is a time in which the thread is not performing instruction processing, and an instruction input priority request flag (BALANCE_PRIORITY_REQ_TH_0) indicating that only one commit stack entry is empty is issued (defined as a load balance analysis element).

The performance load balance analysis unit 9 is configured by a counter circuit 31, a comparator 32 (for thread 0), a comparator 33 (for thread 1), a comparator 34 (for thread 0), a comparator 35 (for thread 1), a latch circuit 36 (for thread 0), and a latch circuit 37 (for thread 1).

The counter circuit 31 is connected to the instruction completion order control unit 7 to acquire an empty flag indicating that only the commit stack entry 12A of the thread 0 is empty. The counter circuit 31 is also connected to the input terminals of the comparator 32, the comparator 33, the comparator 34, and the comparator 35.

In addition, the counter circuit 31 is a counter for acquiring an empty flag (CSE_EMPTY_TH_0_ONLY) indicating that only the thread 0 is empty from the commit stack entry 12A in the instruction completion order control unit 7, and an empty flag (CSE_EMPTY_TH_1_ONLY) indicating that only the thread 1 is empty from the commit stack entry 12B in the instruction completion order control unit 7, and performing counting when these empty flags are "high".

The set terminal (SET) of the latch circuit 36 is connected to the output terminal of the comparator 32. The reset terminal (RESET) of the latch circuit 36 is connected to the output terminal of the comparator 33. The output signal of the latch circuit 36 is output to the instruction input control unit 4.

The set terminal (SET) of the latch circuit 37 is connected to the output terminal of the comparator 34. The reset terminal (RESET) of the latch circuit 37 is connected to the output terminal of the comparator 35. The output signal of the latch circuit 37 is output to the instruction input control unit 4.

Since the 2SMT is assumed in the present embodiment, the area can be reduced by the configuration of a counter specialized for the 2SMT.

Since the purpose of the counter circuit 31 is to distinguish the difference of a cycle in which only the commit stack entry of one thread is empty, it is configured as a counter for adding −1 when the level of CSE_EMPTY_TH_0_ONLY is "high", and +1 when the level of CSE_EMPTY_TH_1_ONLY is "high". That is, it is understood that the instruction processing of one thread only for either is being performed.

For example, when the state in which only the commit stack entry 12B of the thread 1 is empty continues and the bias to the instruction processing of the thread 0 is detected, the value of the counter is added by CSE_EMPTY_TH_1_ONLY to indicate the level of the bias by the value of "+", and is reduced by CSE_EMPTY_TH_0_ONLY to indicate the correction of the bias. On the other hand, when the bias to the thread 1 is detected, the bias is indicated by the value of "−".

In the thread 1, an instruction input priority request threshold (+A) of "+" is set for the comparator 34. In the thread 0, an instruction input priority request threshold (−A) of "−" is set for the comparator 32.

When the value (difference value) of the counter of the counter circuit 31 is smaller than "−A", it is determined that a large bias to the thread 1 is detected, and an instruction input priority request (BALANCE_PRIORITY_REQ_TH_0) of the thread 0 is issued.

The set terminal of the latch circuit 36 is set to "high" and is output to the instruction input control unit 4.

On the other hand, when the value of the counter of the counter circuit 31 exceeds "+A", it is determined that a large bias to the thread 0 is detected, and the instruction input priority request (BALANCE_PRIORITY_REQ_TH_1) of the thread 1 is set to "high" and output to the instruction input control unit 4.

As for correction of the bias, other thresholds, "+B"/"−B", which indicate release thresholds are set. When the value (difference value) of the counter circuit 31 becomes smaller than "+B", it is determined that the bias of the thread 1 has been corrected, and BALANCE_PRIORITY_REQ_TH_1 is set to "low". Thus, BALANCE_PRIORITY_REQ_TH_1 is controlled so that it is set to "high" only when the bias is large.

Also, when the value (difference value) of the counter circuit 31 becomes larger than "−B", it is determined that the bias of the thread 0 has been corrected, and BALANCE_PRIORITY_REQ_TH_0 is set to "low". Thus, BALANCE_PRIORITY_REQ_TH_0 is controlled so that it is set to "high" only when the bias is large.

Since BALANCE_PRIORITY_REQ_TH_0 and BALANCE_PRIORITY_REQ_TH_1 are set when the values of the counter are "−A" or less and "+A" or more respectively, they are not simultaneously set to "high".

In the present embodiment, the case using the counter circuit 31 is described above, but the counter can be prepared for each thread so as to use the value for comparison.

(Instruction Input Control Unit)

FIG. 4 illustrates a circuit of the instruction input control unit 4. The instruction input control unit 4 outputs an instruction to the instruction analysis unit 5 while switching the threads at a specific timing. When the instruction can be input in all threads in a timely manner, the threads are switched every cycle. When the instruction can be input by only one thread in a timely manner, the thread capable of inputting instructions is selected and outputs the instruction to the instruction analysis unit 5, thereby performing an instruction inputting operation with a minimized loss.

The circuit for the thread 0 of the instruction input control unit 4 is configured by an AND circuit 41 (3-input logical product circuit), an AND circuit 42 (2-input logical product circuit), an AND circuit 43 (2-input logical product circuit), an AND circuit 44 (3-input logical product circuit), an AND circuit 45 (2-input logical product circuit), an OR circuit 46 (3-input logical sum circuit), an OR circuit 47 (3-input logical sum circuit), and a latch circuit 48.

The circuit for the thread 1 of the instruction input control unit 4 is configured by the AND circuit 44 (3-input logical product circuit), an AND circuit 410 (2-input logical product circuit), an AND circuit 411 (2-input logical product circuit), the AND circuit 41 (3-input logical product circuit) an AND circuit 413 (2-input logical product circuit), an OR circuit 414 (3-input logical sum circuit), an OR circuit 415 (3-input logical sum circuit), and a latch circuit 416.

A circuit for the thread 0 is described below.

The a input terminal of the AND circuit 41 is connected to the performance load balance analysis unit 9 for acquisition of BALANCE_PRIORITY_REQ_TH_0 when a thread instruction input priority request is issued. The b input terminal of the AND circuit 41 acquires an instruction input enable request (ENABLE_PRESENT_OPERATION_TH_0) indicating that an instruction can be input in the thread 0 from the instruction buffer 10 to the instruction analysis unit 5. The b input terminal of the AND circuit 41 is also connected to the a input terminal of the AND circuit 42, the a input terminal of the AND circuit 43, and the a input terminal (inverse input) of the OR circuit 47.

The c input terminal of the AND circuit 41 is connected to the instruction continuing time monitor unit 11 to acquire a hang-up warning (WARNING_TO_HANG_OPERATION) described later. The c input terminal of the AND circuit 41 is also connected to the c input terminal (inverse input) of the AND circuit 44. The output terminal (FORCE_TH-READ_TO_0) of the AND circuit 41 is connected to the a input terminal of the OR circuit 46.

PRESENT_OPERATION_TH_1 for the thread 1 of the instruction input control unit 4 described later is input to the b input terminal of the AND circuit 42. The output terminal of the AND circuit 42 is connected to the b input terminal of the OR circuit 46.

The instruction input enable request (ENABLE_PRESENT_OPERATION_TH_1) indicating that an instruction can be input in the thread 0 from the instruction buffer 10 to the instruction analysis unit 5 is input to the b input terminal (inverse input) of the AND circuit 43. The b input terminal of the AND circuit 43 is also connected to the b input terminal of the AND circuit 44 and the a input terminal of the AND circuit 45. The output terminal of the AND circuit 43 is connected to the c input terminal of the OR circuit 46.

The a input terminal of the AND circuit 44 is connected to the performance load balance analysis unit 9 to acquire BALANCE_PRIORITY_REQ_TH_1. The output terminal (FORCE_THREAD_TO_1) of the AND circuit 44 is connected to the b input terminal of the OR circuit 47. The output terminal of the AND circuit 45 is connected to the c input terminal of the OR circuit 47.

The output terminal of the OR circuit 46 is connected to the set terminal (SET) of the latch circuit 48, and the output of the OR circuit 47 is connected to the reset terminal (RST) of the latch circuit 48.

The output terminal (PRESENT_OPERATION_TH_0) of the latch circuit 48 is connected to the b input terminal of the AND circuit 45.

A circuit for the thread 1 is described below.

The a input terminal of the OR circuit 414 is connected to the output FORCE_THREAD_TO_1 of the AND circuit 44 described above relating to the circuit for the thread 0.

The b input terminal of the OR circuit 415 is connected to the output FORCE_THREAD_TO_0 of the AND circuit 41 described above relating to the circuit for the thread 0.

PRESENT_OPERATION_TH_0 for the thread 0 of the instruction input control unit 4 described later is input to the b input terminal of the AND circuit 410. The output terminal of the AND circuit 410 is connected to the b input terminal of the OR circuit 414.

The instruction input enable request (ENABLE_PRESENT_OPERATION_TH_0) indicating that an instruction can be input in the thread 0 from the instruction buffer 10 to the instruction analysis unit 5 is input to the b input terminal (inverse input) of the AND circuit 411. The b input terminal of the AND circuit 411 is also connected to the a input terminal of the AND circuit 413. The output terminal of the AND circuit 411 is connected to the c input terminal of the OR circuit 414.

The output terminal of the AND circuit 413 is connected to the c input terminal of the OR circuit 415.

The output terminal of the OR circuit 414 is connected to the set terminal (SET) of the latch circuit 416, and the output of the OR circuit 415 is connected to the reset terminal (RST) of the latch circuit 416.

The output terminal (PRESENT_OPERATION_TH_1) of the latch circuit 416 is connected to the b input terminal of the AND circuit 413.

When a bias occurs in the performance load balance, the instruction input control unit 4 with the configuration above prioritizes the thread 0 when BALANCE_PRIORITY_REQ_TH_0 is "high", prioritizes the thread 1 when BALANCE_PRIORITY_REQ_TH_1 is "high", and selects the thread of the instruction output to the instruction analysis unit 5, thereby realizing the arbitration of the performance load balance.

However, when the thread in which an instruction is input on a priority basis is suspended for any reason, the process cannot be performed even though the instruction is input. Therefore, there is a possibility that the processes will be suspended in both threads at worst. Accordingly, a thread is selected fixedly on a priority basis only when the thread to be prioritized is in a state in which an instruction can be input (ENABLE_PRESENT_OPERATION_TH_1) in a timely manner, thereby reducing the possibility of a hang-up (WARNING_TO_HANG_OPERATION) due to the suppression of the input of an instruction in the opposite thread.

That is, in the AND circuit 41, if a thread instruction input priority request in the thread 0 is issued, BALANCE_PRIORITY_REQ_TH_0 is "high", ENABLE_PRESENT_OPERATION_TH_0 is "high" and an instruction can be input in a timely manner, and WARNING_TO_HANG_OPERATION is "low" without an occurrence of a hang-up, then the output FORCE_THREAD_TO_0 is set to "high". In this case, the latch circuit 48 is set to "high" regardless of the level of the other input terminal of the OR circuit 46.

The AND circuit 42 sets the latch circuit 48 as "high" once in two cycles if an instruction can be input in the threads 0 and 1. That is, if an instruction is input in the thread 1 in the preceding cycle, PRESENT_OPERATION_TH_1 becomes "high", and ENABLE_PRESENT_OPERATION_TH_0 is "high". Therefore, the output of the AND circuit 42 becomes "high".

The AND circuit 43 sets "high" for the latch circuit 48 if an instruction can be input only in the thread 0. Since ENABLE_PRESENT_OPERATION_TH_0 is "high" and ENABLE_PRESENT_OPERATION_TH_1 is "low", the output of the AND circuit 43 becomes "high".

The latch circuit 48 is set to "high" depending on the above condition determined by the AND circuit 41, the AND circuit 42, and the AND circuit 43.

The output of the AND circuit 44 becomes "high" when the thread 1 is designated. That is, when a thread instruction input priority request is issued in the thread 0, BALANCE_PRIORITY_REQ_TH_1 becomes "high". If ENABLE_PRESENT_OPERATION_TH_1 is "high" and an instruction can be input in a timely manner, and WARNING_TO_HANG_OPERATION is "low" without an occurrence of a hang-up, the AND circuit 44 sets the output FORCE_THREAD_TO_1 as "high". In this case, the latch circuit 48 is reset to "low" regardless of the level of the other input terminal of the OR circuit 47.

The AND circuit 45 resets the latch circuit 48 as "low" once in two cycles if an instruction can be input in the threads 0 and 1. That is, if an instruction is input in the thread 0 in the preceding cycle, PRESENT_OPERATION_TH_0 becomes "high" and ENABLE_PRESENT_OPERATION_TH_1 is "high". Therefore, the output of the AND circuit 45 becomes "high".

The latch circuit 48 is reset to "low" depending on the above condition determined by the AND circuit 44, the AND circuit 45, and ENABLE_PRESENT_OPERATION_TH_0.

The control is performed on the circuit for the thread 1 as in the thread 0.

That is, in the AND circuit 44, when a thread instruction input priority request in the thread 1 is issued and FORCE_THREAD_TO_1 becomes "high", the latch circuit 416 is set to "high" regardless of the level of the other input terminal of the OR circuit 414.

The AND circuit 410 sets the latch circuit 416 as "high" once in two cycles if an instruction can be input in the threads 0 and 1. That is, if an instruction is input in the thread 0 in the preceding cycle, PRESENT_OPERATION_TH_0 becomes "high", and ENABLE_PRESENT_OPERATION_TH_1 is "high". Therefore, the output of the AND circuit 410 becomes "high".

The AND circuit 411 sets the latch circuit 416 as "high" if an instruction can be input only in the thread 0. Since ENABLE_PRESENT_OPERATION_TH_1 is "high" and ENABLE_PRESENT_OPERATION_TH_0 is "low", the output of the AND circuit 411 becomes "high".

The latch circuit 416 is set to "high" depending on the above condition determined by the AND circuit 44, the AND circuit 410, and the AND circuit 411.

When a thread instruction input priority request in the thread 0 is issued and FORCE_THREAD_TO_0 becomes "high" in the AND circuit 41, the latch circuit 416 is reset to "low" regardless of the level of the other input terminal of the OR circuit 415.

If an instruction can be input in the threads 0 and 1, the AND circuit 413 resets the latch circuit 416 as "low" once in two cycles. If an instruction is input in the thread 1 in the preceding cycle, PRESENT_OPERATION_TH_1 becomes "high" and ENABLE_PRESENT_OPERATION_TH_0 is "high". Therefore, the output of the AND circuit 413 becomes "high".

The latch circuit 416 is reset to "low" depending on the above condition determined by the AND circuit 41, the AND circuit 413, and ENABLE_PRESENT_OPERATION_TH_0.

(Instruction Continuing Time Monitor Unit)

Furthermore, by releasing a fixing of a thread in which an instruction is input when the instruction processing of a suppressed thread is suspended for a predetermined time, the possibility of causing a hang-up by forcibly fixing a thread can be avoided.

The instruction continuing time monitor unit 11 is a circuit for monitoring the hang-up. The instruction continuing time monitor unit 11 prepares a counter for resetting a value upon completion of the process of an instruction by performing counting every cycle. Since the counter continues counting while an instruction is not completed, it indicates the time in which the instruction of the thread is suspended in some stage to the commit stage. In the present embodiment, the instruction continuing time monitor unit 11 sets a threshold "C" of the counter, and when the counter value exceeds the threshold "C" in any thread, it outputs a hang-up warning (WARNING_TO_HANG_OPERATION) to the instruction input control unit 4 and requests that the arbitration of the performance load balance stop.

In the present embodiment, the case in the 2SMT is described. It is also possible, when the number of threads increases, to prioritize inputting an instruction to a thread when the cycle in which a commit stack entry of each thread is empty is counted and the difference becomes larger after comparing the counter value of the thread with a value of the other thread. With this configuration, the performance load balance can be arbitrated.

Figure 5:
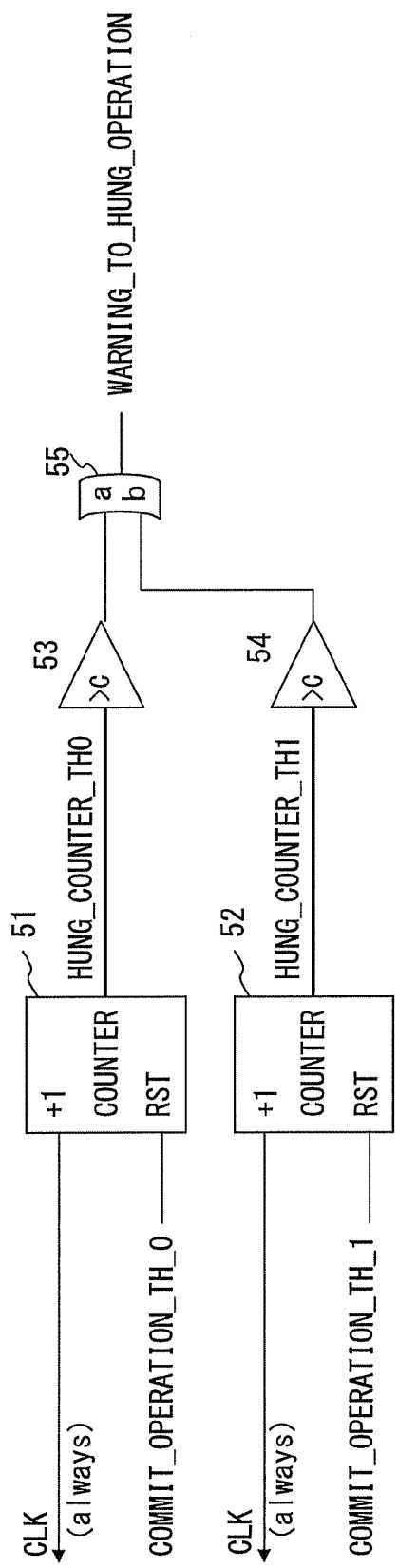
FIG. 5 is a block diagram of a configuration of an instruction continuing time monitor unit.

FIG. 5 illustrates a circuit of the instruction continuing time monitor unit 11.

The instruction continuing time monitor unit 11 is configured by a counter circuit 51, a counter circuit 52, a comparator 53, a comparator 54, and an OR circuit 55 (2-input logical sum circuit).

The counter circuit 51 inputs a clock (CLK) from an input terminal (+) and performs counting. An instruction completion notification in the thread 0 output from the instruction completion order control unit 7, that is, COMMIT_OPERATION_TH_0, is received by the reset terminal (RST).

The counter circuit 52 inputs a clock (CLK) from the input terminal (+) and performs counting. An instruction completion notification in the thread 1 output from the instruction completion order control unit 7, that is, COMMIT_OPERATION_TH_1, is received by the reset terminal (RST).

The comparator 53 predetermines "C" as a threshold of a counter, and outputs "high" from the output terminal when the count value of the counter circuit 51 exceeds "C".

The comparator 54 predetermines "C" as a threshold of the counter, and outputs "high" from the output terminal when the count value of the counter circuit 51 exceeds "C".

The OR circuit 55 (2-input logical sum circuit) inputs the output of the comparator 53 and the comparator 54 to the a input terminal and the b input terminal respectively, and outputs a hang-up warning (WARNING_TO_HANG_OPERATION).

(Operation of Information Processing Device)

Figure 6:
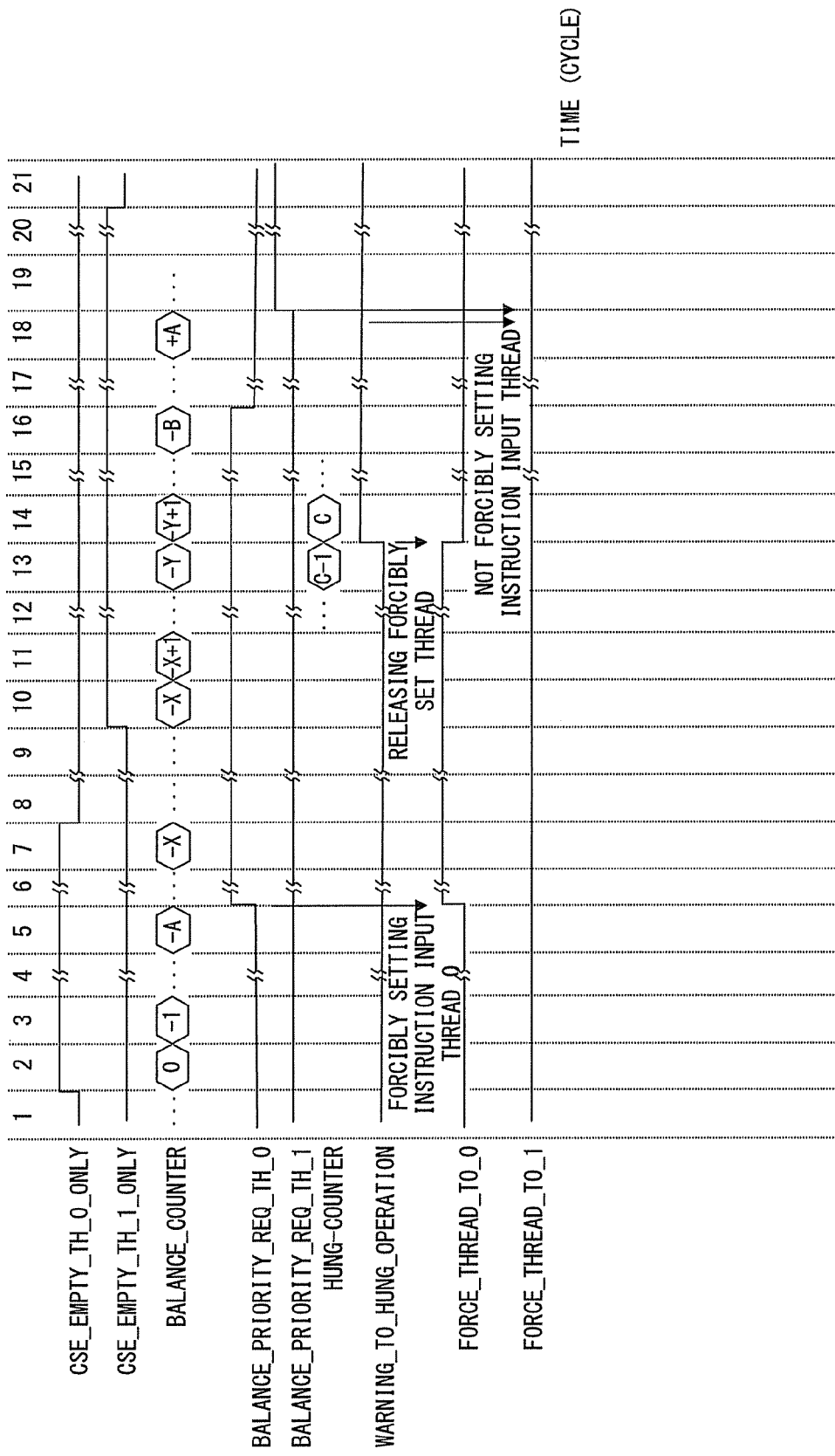
FIG. 6 is a time chart of an operation timing illustrating an operation of the information processing device of the present invention.

FIG. 6 is a time chart of an operation of the information processing device according to the present embodiment. The operation of the circuit described above is described with reference to the time chart.

The vertical axis indicates (1) CSE_EMPTY_TH_0_ONLY, (2) CSE_EMPTY_TH_1_ONLY, (3) BALANCE_COUNTER, (4) BALANCE_PRIORITY_REQ_TH_0, (5) BALANCE_PRIORITY_REQ_TH_1, (6) HANG_COUNTER, (7) WARNING_TO_HANG_OPERATION, (8) FORCE_THREAD_TO_0, and (9) FORCE_THREAD_TO_1, and the horizontal axis indicates a time axis (clock).

From period 1 to period 2, the empty flag (1) CSE_EMPTY_TH_0_ONLY indicating that only the commit stack entry 12A is empty changes from "low" to "high".

While (1) CSE_EMPTY_TH_0_ONLY input to the counter circuit 31 of the performance load balance analysis unit 9 is "high", the counter circuit 31 continues counting, and the count value (3) BALANCE_COUNTER is output from the output terminal of the counter circuit 31.

From period 3, the counter circuit 31 adds "−1" for each clock. The count value is increased, and the addition is performed up to period 5 in which a preset value "−A" is reached.

In period 6, the output of the comparator 32 changes to "high", and the latch circuit 36 is set to "high". As a result, the output (4) BALANCE_PRIORITY_REQ_TH_0 of the latch circuit 36 is changed to "high". In this case, if BALANCE_PRIORITY_REQ_TH_0 is input to the instruction input control unit 4 and to the a terminal of the AND circuit 41, and the instruction input enable request ENABLE_PRESENT_OPERATION_TH_0 is "high", then (7) WARNING_TO_HANG_OPERATION is "low". Therefore, the output (8) FORCE_THREAD_TO_0 of the AND circuit 41 becomes "high". The latch circuit 48 is set to "high".

In period 7, the addition is further performed in the thread 0 and the count value becomes "−X". In period 8, since the commit stack entry 12A is not empty any more, the empty flag (1) CSE_EMPTY_TH_0_ONLY changes from "high" to "low". Since both CSE_EMPTY_TH_0_ONLY and CSE_EMPTY_TH_1_ONLY are "low", the count value does not change as the output of the counter circuit 31 until period 9.

In period 10, the empty flag (2) CSE_EMPTY_TH_1_ONLY indicating that only the commit stack entry 12B is empty changes from "low" to "high".

In period 11, "1" is added to "−X", then the count value is increased for each clock, and the addition is performed up to period 16 in which a predetermined value "−B" is reached.

In period 14, when the value of (6) HANG_COUNTER exceeds a predetermined threshold "C" and (7) WARNING_TO_HANG_OPERATION becomes "high", "high" is input to the c input terminal of the AND circuit 41, and the output FORCE_THREAD_TO_0 of the AND circuit 41 becomes "low". In this case, forcing the inputting of an instruction in the thread 0 is released.

In period 16, the count value of the counter circuit 31 becomes larger than "−B". Thus, it is determined that the bias of the instruction processing balance among the threads has been corrected, the output of the comparator 33 outputs "high", and the latch circuit 36 is reset. Therefore, BALANCE_PRIORITY_REQ_TH_0 becomes "low".

From period 17 to period 18, CSE_EMPTY_TH_0_ONLY keeps "high" as is, and when the addition is performed until a predetermined value "+A" is reached, (5) BALANCE_PRIORITY_REQ_TH_1 becomes "high". In this case, since (7) WARNING_TO_HANG_OPERATION is kept at "high", the forcible selection of the thread in which an instruction is input is cancelled.

(Flowchart of the Operation of the Present Embodiment)

Figure 7:
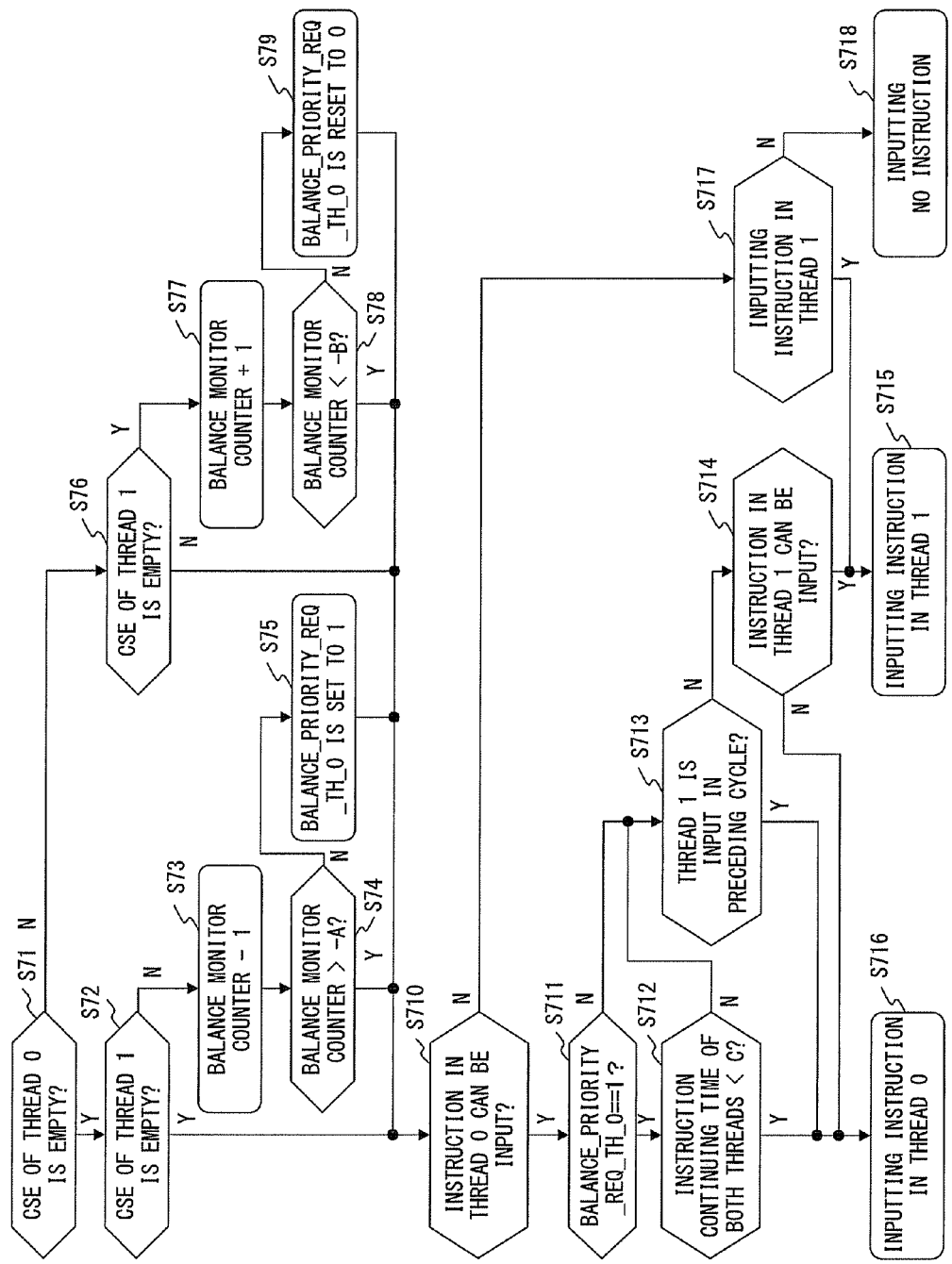
FIG. 7 is a flowchart of an operation of the information processing device of the present invention.

FIG. 7 is an explanatory view of the flowchart of the operation in the thread 0 according to the present embodiment.

The steps S71 through S79 are described below (performance load balance analyzing step).

In step S71, it is determined whether or not the commit stack entry in the thread 0 is empty. If the commit stack entry in the thread 0 is empty, control is passed to step S72. If it is not empty, control is passed to step S76.

In step S72, it is determined whether or not the commit stack entry in the thread 1 is empty. If the commit stack entry in the thread 1 is empty, control is passed to step S710. If it is not empty, control is passed to step S73. When CSE_EMPTY_TH_0_ONLY output from the commit stack entry 12A in the thread 0 is "high", control is passed to step S73.

In step S73, while CSE_EMPTY_TH_0_ONLY is "high", "−1" is added to the counter for monitoring the balance for each clock. That is, while "high" is input to the input terminal (−1) of the counter circuit 31 illustrated in FIG. 3, "−1" is added for each clock.

In step S74, it is determined whether or not the count value of the counter for monitoring the balance is larger than a predetermined instruction input priority request threshold "−A". If it is larger than "−A", control is passed to step S710. If it is equal to or smaller than "−A", control is passed to step S75.

The value of the output BALANCE_COUNTER of the counter circuit 31 is compared with the instruction input priority request threshold set in the comparator 32, and the result is output.

In step S75, BALANCE_PRIORITY_REQ_TH_0 is set to "high".

In this case, the RST input terminal of the latch circuit 36 is "low".

In step S76, it is determined whether or not a commit stack entry in the thread 1 is empty. If the commit stack entry in the thread 1 is empty, control is passed to step S710. If it is not empty, control is passed to step S77. When CSE_EMPTY_TH_1_ONLY output from the commit stack entry 12A in the thread 1 is "high", control is passed to step S77.

In step S77, "+1" is added to the counter for monitoring the balance. When CSE_EMPTY_TH_0_ONLY becomes "low", and while CSE_EMPTY_TH_1_ONLY is "high", "+1" is added for each clock. That is, while "high" is input to the input terminal (+1) of the counter circuit 31 illustrated in FIG. 3, "+1" is added for each clock.

In step S78, it is determined whether or not the count value of the balance monitor counter is smaller than a predetermined release threshold "−B". If it is smaller than "−B", control is passed to step S710. If it is equal to or larger than "−B", control is passed to step S79.

The value of the output BALANCE_COUNTER of the counter circuit 31 is compared with the release threshold set in the comparator 33. If the count value (difference value) exceeds the release threshold, "high" is output.

Steps S710, S711, S713 through S718 (instruction acquisition control step), and S712 (instruction continuing time monitoring step) are described below.

In step S710, it is determined whether or not an instruction can be input in the thread 0. If an instruction can be input, control is passed to step S711. If it cannot be input, control is passed to step S717. It is determined whether or not ENABLE_PRESENT_OPERATION_TH_0 indicating that an instruction in the thread 0 can be input from the instruction acquisition control unit 3 is "high".

In step S711, it is determined whether or not BALANCE_PRIORITY_REQ_TH_0 is "high". If it is "high", control is passed to step S712. If it is "low", control is passed to step S713.

In step S712, if the instruction continuing time of both threads is smaller than a predetermined hang-up threshold "C", control is passed to step S716. If it is larger than the hang-up threshold "C", control is passed to step S713. That is, if WARNING_TO_HANG_OPERATION is "low", an instruction in the thread 0 can be input.

In step S713, it is determined whether or not an instruction in the thread 1 is input in the preceding cycle.

If it is input, control is passed to step S716. If it is not input, control is passed to step S714. It is determined whether or not PRESENT_OPERATION_TH_1 is "high".

In steps S714 and S717, it is determined whether or not an instruction in the thread 1 can be input. If it can be input, control is passed to step S715. It is determined whether or not ENABLE_PRESENT_OPERATION_TH_1 is "high".

In step S715, an instruction in the thread 1 is input. In step S716, an instruction in the thread 0 is input. In step S718, no instruction is input.

The operation of the thread 1 is similar to the operation of the thread 0. Steps S71' through S718' correspond to steps S71 through S718.

In step S71', it is determined whether or not a commit stack entry in the thread 1 is empty. If the commit stack entry in the thread 1 is empty, control is passed to step S72'. If it is not empty, control is passed to step S76'.

In step S72', it is determined whether or not the commit stack entry in the thread 0 is empty. If the commit stack entry in the thread 0 is empty, control is passed to step S710'. If it is not empty, control is passed to step S73'. When CSE_EMPTY_TH_1_ONLY output from the commit stack entry 12B in the thread 1 is "high", control is passed to step S73'.

In step S73', while CSE_EMPTY_TH_1_ONLY is "high", "+1" is added to the counter for monitoring the balance for each clock. That is, while "high" is input to the input terminal (+1) of the counter circuit 31 illustrated in FIG. 3, "+1" is added for each clock.

In step S74', it is determined whether or not the count value of the counter for monitoring the balance is smaller than a predetermined instruction input priority request threshold "+A". If it is smaller than "+A", control is passed to step S710'. If it is equal to or smaller than "+A", control is passed to step S75'

The value of the output BALANCE_COUNTER of the counter circuit 31 is compared with the instruction input priority request threshold set in the comparator 34, and the result is output.

In step S75', BALANCE_PRIORITY_REQ_TH_1 is set to "high". In this case, the RST input terminal of the latch circuit 37 is "low".

In step S76', it is determined whether or not the commit stack entry in the thread 0 is empty. If the commit stack entry in the thread 0 is empty, control is passed to step S710'. If it is not empty, control is passed to step S77'. When CSE_EMPTY_TH_0_ONLY output from the commit stack entry 12B in the thread 0 is "high", control is passed to step S77'.

In step S77', "−1" is added to the counter for monitoring the balance. When CSE_EMPTY_TH_1_ONLY becomes "low" and while CSE_EMPTY_TH_0_ONLY is "high", "−1" is added for each clock. That is, while "high" is input to the input terminal (−1) of the counter circuit 31 illustrated in FIG. 3, "−1" is added for each clock.

In step S78', it is determined whether or not the count value of the balance monitor counter is larger than a predetermined release threshold "+B". If it is larger than "+B", control is passed to step S710'. If it is equal to or smaller than "+B", control is passed to step S79'

The value of the output BALANCE_COUNTER of the counter circuit 31 is compared with the thread set in the comparator 35, and if the count value (difference value) exceeds the release threshold, "high" is output.

In step S710', it is determined whether or not an instruction in the thread 1 can be input. If it can be input, control is passed to step S711'. If it cannot be input, control is passed to step S717'. It is determined whether or not ENABLE_PRESENT_OPERATION_TH_1 indicating that an instruction in the thread 1 can be input from the instruction acquisition control unit 3 is "high".

In step S711', it is determined whether or not BALANCE_PRIORITY_REQ_TH_1 is "high". If it is "high", control is passed to step S712'. If it is "low", control is passed to step S713'.

In step S712', if the instruction continuing time of both threads is smaller than a predetermined hang-up threshold "C", control is passed to step S716'. If it is larger than the hang-up threshold "C", control is passed to step S713'. That is, if WARNING_TO_HANG_OPERATION is "low", an instruction in the thread 1 can be input.

In step S713', it is determined whether or not an instruction in the thread 0 is input in the preceding cycle. If it is input, control is passed to step S716'. If it is not input, control is passed to step S714'. It is determined whether or not PRESENT_OPERATION_TH_0 is "high".

In steps S714' and S717', it is determined whether or not an instruction in thread 0 can be input. If it can be input, control is passed to step S715'. It is determined whether or not ENABLE_PRESENT_OPERATION_TH_1 is "high".

In step S715', an instruction in the thread 0 is input. In step S716', an instruction in the thread 1 is input. In step S718', no instruction is input.

The present invention is not limited to the embodiments above, but can be flexibly improved and changed within the scope of the gist of the present invention.

What is claimed is:

1. An information processing device connected to a memory capable of realizing a simultaneous multi-threading system, the information processing device comprising:
    an arithmetic unit configured to perform an operation;
    an instruction input control unit configured to control inputting an instruction from a plurality of threads to the arithmetic unit from the memory;
    a plurality of commit stack entry units respectively provided for the plurality of threads to hold information obtained by decoding the instruction, the information indicating whether instruction processing of the decoded instruction is being performed;
    an instruction completion order control unit configured to update the memory and a general purpose register depending on an arithmetic result obtained by the arithmetic unit in an order of the instructions input from the instruction input control unit; and
    a performance load balance analysis unit configured to detect the information registered in the commit stack entry units and to control the instruction input control unit based on the result of the detection,
    wherein the instruction input control unit forces to switch inputting an instruction from a first thread of the plurality of threads corresponding to a first commit stack entry unit of the plurality of commit stack entry units to inputting an instruction from a second thread of the plurality of threads corresponding to a second commit stack entry unit of the plurality of commit stack entry units when a period indicating only the second commit stack entry is empty and does not hold information exceeds a designated period.

2. The information processing device according to claim 1, wherein
    the instruction completion order control unit defines a time in which the information is not registered in one of the commit stack entry units as a time in which one of the threads corresponding to the one of the commit stack entry units does not perform instruction processing, and generates a first empty flag indicating that only the first commit stack entry unit is empty and a second empty flag indicating that only the second commit stack entry unit is empty.

3. The information processing device according to claim 2, wherein
    the performance load balance analysis unit:
    generates a difference value indicating a difference between a first time in which the first empty flag is issued and a second time in which the second empty flag is issued;
    compares the difference value with an instruction input priority request threshold, and generates an instruction input priority request flag for switching to the second thread when the difference value exceeds the instruction input priority request threshold; and
    the instruction input control unit switches from inputting the instruction from the first thread to inputting the instruction from the second thread based on the instruction input priority request flag.

4. The information processing device according to claim 3, wherein
    the performance load balance analysis unit compares the difference value with a release threshold, and releases the instruction input priority request flag when the difference value becomes smaller than the release threshold.

5. The information processing device according to claim 1, wherein
    the instruction completion order control unit comprises an instruction continuing time monitor unit configured to output to the instruction input control unit a hang-up warning to avoid causing a hang-up by forcibly fixing a thread for instruction processing so as to release the thread for instruction processing when the instruction processing of a suppressed thread is suspended for a predetermined time.

6. The information processing device according to claim 1, wherein
    the instruction input control unit switches a thread for instruction processing in each cycle when all the threads can input the instruction in a timely manner, and selects one of the threads that can input the instruction when only the one of the threads can input the instruction in a timely manner.

7. An inter-thread load arbitration control method for an information processing device connected to a memory and capable of realizing a simultaneous multi-threading system, the inter-thread load arbitration control method comprising:
    acquiring an instruction from the memory;
    controlling input of an instruction from a plurality of threads to an arithmetic unit from the memory so as to perform an operation on a basis of the instruction for each of a plurality of threads by the arithmetic unit;
    detecting information registered in a plurality of commit stack entry units respectively provided for the plurality of threads to hold information obtained by decoding the instruction, the information indicating whether instruction processing of the decoded instruction is being performed; and
    forcing to switch inputting an instruction from a first thread of the plurality of threads corresponding to a first commit stack entry unit of the plurality of commit stack entry units to inputting an instruction from a second thread of the plurality of threads corresponding to a second commit stack entry unit of the plurality of commit stack entry units when a period indicating only the second commit stack entry is empty and does not hold information exceeds a designated period.

8. The load arbitration control method according to claim 7, wherein
    a time in which the information is not registered in one of the commit stack entry units is defined as a time in which one of the threads corresponding to the one of the commit stack entry units does not perform instruction processing, and a first empty flag indicating that only the first commit stack entry unit is empty and a second empty flag indicating that only the second commit stack entry unit is empty are acquired.

9. The load arbitration control method according to claim 8, wherein:
a difference value indicating a difference between a first time in which the first empty flag is issued and a second time in which the second empty flag is issued is generated;
the difference value resulting from the counting on the commit stack entry is compared with an instruction input priority request threshold;
an instruction input priority request flag for switching to the second thread is generated when the difference value exceeds the instruction input priority request threshold; and
inputting the instruction from the first thread is switched to inputting the instruction from the second thread based on the instruction input priority request flag.

10. The load arbitration control method according to claim 9, wherein:
the difference value is compared with a release threshold; and
the instruction input priority request flag is released when the difference value becomes smaller than the release threshold.

11. The load arbitration control method according to claim 7, wherein
a thread for instruction processing is released when the instruction processing of a suppressed thread is suspended for a predetermined time.

12. The load arbitration control method according to claim 7, wherein:
a thread for instruction processing is switched in each cycle when all the threads can input the instruction in a timely manner; and
one of the threads that can input the instruction is selected when only the one of the threads can input the instruction in a timely manner.

* * * * *